(12) United States Patent
Lee et al.

(10) Patent No.: US 12,224,394 B2
(45) Date of Patent: Feb. 11, 2025

(54) LITHIUM SECONDARY BATTERY

(71) Applicant: LG Energy Solution, Ltd., Seoul (KR)

(72) Inventors: Min Wook Lee, Daejeon (KR); Ju Young Yun, Daejeon (KR); Seok Jin Oh, Daejeon (KR); Joo Hwan Sung, Daejeon (KR); Hee Chang Youn, Daejeon (KR); Ji Min Park, Daejeon (KR); Hye In Ko, Daejeon (KR); Ran Eun Lee, Daejeon (KR); Jin Young Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/737,132

(22) Filed: Jun. 7, 2024

(65) Prior Publication Data

US 2024/0413380 A1 Dec. 12, 2024

(30) Foreign Application Priority Data

Jun. 9, 2023 (KR) ........................ 10-2023-0074462

(51) Int. Cl.
| | |
|---|---|
| *H01M 10/052* | (2010.01) |
| *H01M 4/131* | (2010.01) |
| *H01M 4/133* | (2010.01) |
| *H01M 4/36* | (2006.01) |
| *H01M 4/525* | (2010.01) |
| *H01M 4/587* | (2010.01) |
| *H01M 4/62* | (2006.01) |
| *H01M 10/0568* | (2010.01) |
| *H01M 50/204* | (2021.01) |
| *H01M 4/02* | (2006.01) |

(52) U.S. Cl.
CPC ......... *H01M 10/052* (2013.01); *H01M 4/131* (2013.01); *H01M 4/133* (2013.01); *H01M 4/366* (2013.01); *H01M 4/525* (2013.01); *H01M 4/587* (2013.01); *H01M 4/628* (2013.01); *H01M 10/0568* (2013.01); *H01M 50/204* (2021.01); *H01M 2004/021* (2013.01)

(58) Field of Classification Search
None
See application file for complete search history.

(56) References Cited

U.S. PATENT DOCUMENTS

| | | | |
|---|---|---|---|
| 2014/0134491 A1 | 5/2014 | Sugimoto et al. | |
| 2019/0221829 A1 | 7/2019 | Kim et al. | |
| 2019/0305308 A1 | 10/2019 | Lee et al. | |
| 2019/0393479 A1 | 12/2019 | Kim et al. | |
| 2020/0251719 A1 | 8/2020 | Chung et al. | |
| 2020/0343550 A1 | 10/2020 | Cho et al. | |
| 2020/0343551 A1 | 10/2020 | Cho et al. | |
| 2021/0025771 A1 | 1/2021 | Park et al. | |
| 2022/0029152 A1 | 1/2022 | Lee et al. | |
| 2022/0123287 A1 | 4/2022 | Wang et al. | |
| 2022/0181615 A1 | 6/2022 | Lee et al. | |
| 2022/0328833 A1 | 10/2022 | Lee et al. | |
| 2022/0407068 A1 | 12/2022 | Piao et al. | |
| 2023/0155127 A1 | 5/2023 | Kim et al. | |
| 2023/0207804 A1 | 6/2023 | Xu et al. | |
| 2023/0352682 A1 | 11/2023 | Otani et al. | |
| 2023/0369578 A1 | 11/2023 | Eom et al. | |

FOREIGN PATENT DOCUMENTS

| | | |
|---|---|---|
| JP | WO 2012176471 A1 | 2/2015 |
| JP | 2023503699 A | 1/2023 |
| KR | 101288743 B1 | 7/2013 |
| KR | 20130100595 A | 9/2013 |
| KR | 2018-0035693 A | 4/2018 |
| KR | 20200107856 A | 9/2020 |
| KR | 20200125443 A | 11/2020 |
| KR | 102361317 B1 | 2/2022 |
| KR | 20220014185 A | 2/2022 |
| KR | 20220091419 A | 6/2022 |
| KR | 20220110122 A | 8/2022 |
| KR | 20230009522 A | 1/2023 |
| KR | 102504642 B1 | 2/2023 |
| KR | 102534279 B1 | 5/2023 |
| WO | 2022-168233 A1 | 8/2022 |
| WO | 2022-241712 A1 | 11/2022 |

OTHER PUBLICATIONS

Gang, Myung-Bo, et al., "Numerical analysis on thermal runaway by cathode active materials in lithium-ion batteries." Korea Society of Geothermal Energy Engineers, vol. 17, No. 2, (2021), pp. 1-10. https://doi.org/10.17664/ksgee.2021.17.2.001.
Extended European Search Report including Written Opinion for Application No. 241809250 dated Nov. 14, 2024. 8 pgs.
Zhang Zhi et al: "A low cost single-crystalline LiNi0.60Co0.10Mn0.3002 layered cathode enables remarkable cycling performance of lithium-ion batteries at elevated temperature", Journal of Power Sources, Elsevier, Amsterdam, NL, vol. 503, May 26, 2021 (May 26, 2021), XP086603058.
International Search Report for Application No. PCT/KR2024/007815 mailed Dec. 10, 2024. 11 pgs.

*Primary Examiner* — Carlos Barcena
(74) *Attorney, Agent, or Firm* — Lerner David LLP

(57) ABSTRACT

The present disclosure relates to a lithium secondary battery with improved safety during thermal runaway. The lithium secondary battery includes a positive electrode including a positive electrode active material, a negative electrode including a negative electrode active material, and an electrolyte, and has a nominal voltage of 3.68 V or greater, and $V_T$ represented by Equation (1) below measured after manufacturing a test module by stacking four of the lithium secondary battery fully charged by being charged to 4.35 V is 4 Ah/sec or less: Equation (1): $V_T = C_{total}/t$.

20 Claims, 2 Drawing Sheets

[FIG. 1]
[FIG. 2]
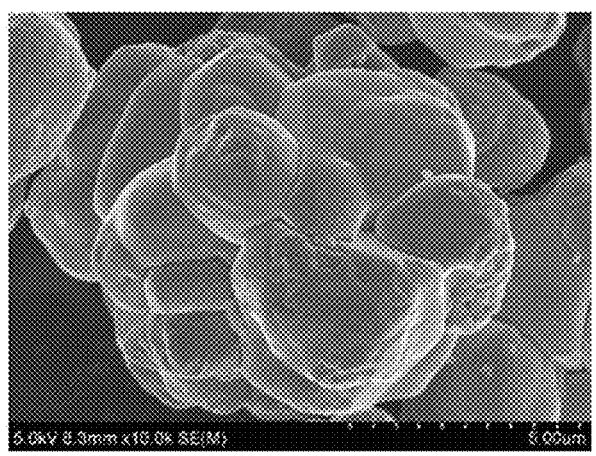

[FIG. 3]
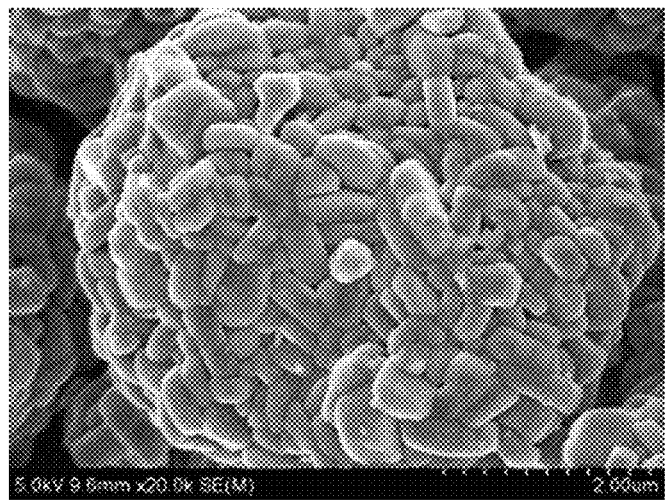

LITHIUM SECONDARY BATTERY

CROSS-REFERENCE TO RELATED APPLICATION

This application claims the benefit of priority based on Korean Patent Application No. 10-2023-0074462, dated Jun. 9, 2023, the entire disclosure of which is incorporated by reference herein.

TECHNICAL FIELD

The present disclosure relates to a lithium secondary battery, and more particularly, to a lithium secondary battery with improved safety during thermal runaway.

BACKGROUND

With the development of technologies such as electric vehicles, energy storage systems (ESS), and portable electronic devices, the demand for lithium secondary batteries as an energy source is rapidly increasing.

In the case of devices that require large capacity, such as electric vehicles or energy storage systems, batteries in the form of modules and/or packs equipped with a plurality of secondary battery cells are used. When one secondary battery cell ignites or explodes in such a battery module and/or pack due to internal or external factors, a thermal runway propagation phenomenon occurs in which heat, flame, and high-pressure gases, and the like are propagated to other adjacent cells, and as a result, the adjacent cells explode in series, causing a major safety problem.

Meanwhile, in the field of electric vehicles, cells with high energy density are required to increase mileage per trip. Accordingly, in recent years, cells to which a high-nickel NCM positive electrode active material having a nickel content of 80% or greater and/or a Si-based negative electrode active material excellent in capacitance properties are applied have been developed as lithium secondary batteries for electric vehicles. However, in the case of these cells, there is a problem in that thermal runaway propagation occurs quickly due to a high explosion pressure during thermal runaway, which reduces safety.

Typically, a technique for inserting a fireproof insulation material or the like into a module or pack has been applied to prevent thermal propagation to neighboring cells. However, when the fireproof insulation material is inserted into the module or pack, energy density is reduced, which causes a problem in that the mileage of a vehicle decreases.

Therefore, there is a demand to develop a lithium secondary battery with high energy density and suppressed thermal runaway propagation.

BRIEF SUMMARY

An aspect of the present disclosure provides a lithium secondary battery which has a low thermal propagation velocity during thermal runaway, and is stably operated at a high voltage, allowing implementation of high energy density.

According to an aspect of the present disclosure, there is provided a lithium secondary battery which includes a positive electrode including a positive electrode active material, a negative electrode including a negative electrode active material, and an electrolyte, wherein the lithium secondary battery has a nominal voltage of 3.68 V or greater, and $V_T$ represented by Equation (1) below measured after manufacturing a test module by stacking four of the lithium secondary batteries, each of which is fully charged by being charged to 4.35 V is 4 Ah/sec or less, preferably 1 Ah/sec to 4 Ah/sec, and more preferably 2 Ah/sec to 4 Ah/sec.

$$V_T = C_{total}/t \qquad \text{Equation (1):}$$

wherein, $C_{total}$ is the total discharge capacity of the test module, and t is the time taken, after one lithium secondary battery disposed at the outermost periphery of the test module is heated so as to be ignited, from a point of time at which the voltage of the lithium secondary battery disposed at the outermost periphery becomes 0 until a point of time at which the voltage of all lithium secondary batteries in the test module becomes 0.

Meanwhile, the total discharge capacity of the test module ($C_{total}$) is the sum of discharge capacities measured by CC-CV charging and then CC discharging each lithium secondary battery in the test module in the voltage range of 2.5 V to 4.35 V at 0.33 C at 25 degrees C. CC refers to constant current and CV refers to constant voltage.

The lithium secondary battery in test module may have, for example, but is not limited to, an overall width of 50 mm to 300 mm, an overall length of 50 mm to 1,000 mm and a thickness of 2 mm to 40 mm, preferably an overall width of 50 mm to 200 mm, an overall length of 100 mm to 800 mm and a thickness of 2 mm to 30 mm, more preferably an overall width of 50 mm to 200 mm, an overall length of 200 mm to 500 mm and a thickness of 5 mm to 15 mm. According to an embodiment, the lithium secondary battery in test module may have an overall width of 100 mm, an overall length of 300 mm and a thickness of 8.5 mm.

The test module is manufactured by stacking the lithium secondary batteries in the direction of thickness of the lithium secondary battery.

In addition, heating of the lithium secondary battery can be performed by attaching a 260 mm×90 mm mica heater connected to a PID controller (Proportional Integral Derivative controller) to the lithium secondary battery and heating it with an output of 300 W.

The $V_T$ of a test module is the capacity of the test module ($C_{total}$) divided by the thermal propagation time (t). As the dimensions of the test module increase, the capacity and thermal propagation time of the test module increase together, so $V_T$ does not depend on the dimension of the test module.

According to an embodiment, the positive electrode active material may include 50 wt % or greater, preferably 70 wt % or greater, and more preferably 90 wt % to 100 wt % of a single particle-type lithium nickel-based oxide having a Ni content of 70 mol % or less relative to all metals excluding lithium with respect to a total amount of the positive electrode active material. More preferably, the positive electrode active material may consist of a single particle-type lithium nickel-based oxide having a Ni content of 70 mol % or less.

The single particle-type lithium nickel-based oxide includes 30 or fewer nodules, wherein the average particle diameter of the nodules may be from 0.8 μm to 4.0 μm.

The single particle-type lithium nickel-based oxide may be represented by Formula 1 below:

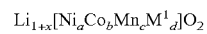

[Formula 1]

wherein, $M^1$ includes one or more elements of Ti, Mg, Al, Zr, Y, Ba, Ca, Sr, W, Ta, Nb, or Mo, and $-0.1 \leq x \leq 0.1$, $0.5 \leq a \leq 0.7$, $0 < b < 0.5$, $0 < c < 0.5$, and $0 \leq d \leq 0.2$.

The single particle-type lithium nickel-based oxide may further include a coating layer on the surface thereof, wherein the coating layer includes one or more elements of Ti, Mg, Al, Zr, Y, Ba, Ca, Sr, W, Ta, Nb, or Mo.

Meanwhile, the negative electrode active material layer may consist of a carbon-based negative electrode active material.

Preferably, the negative electrode includes a negative electrode current collector, a first negative electrode active material layer formed on the negative electrode current collector, and including a first negative electrode active material, and a second negative electrode active material layer formed on the first negative electrode active material layer, and including a second negative electrode active material, wherein each of the first negative electrode active material and the second negative electrode active material may consist of a carbon-based negative electrode active material, and each of the first negative electrode active material and the second negative electrode active material may be natural graphite, artificial graphite, or a mixture thereof. Preferably, the weight ratio of the artificial graphite to the total weight of the negative electrode active material in the second negative electrode active material layer may be higher than the weight ratio of the artificial graphite to the total weight of the negative electrode active material in the first negative electrode active material layer.

The electrolyte may include an organic solvent and a lithium salt, and $W_I$, which is the content of the imide-based lithium salt among the total lithium salts, may satisfy the following equation (2):

$$0 \le W_1 \le \frac{40.01}{1 + \exp\left(\frac{a - 69.9999}{1.2}\right)} \quad (2)$$

wherein, a is mol % Ni based on all metals excluding lithium of the positive electrode active material.

When $W_I$, which is the content of imide-based lithium salt among the total lithium salts contained in the electrolyte, satisfies the above range, the propagation of flame and/or heat to neighboring cells during thermal runaway can be minimized.

The lithium secondary battery may have an electrolyte weight per unit capacity of 1.0 g/Ah to 3.0 g/Ah.

The lithium secondary battery may have a charging cut-off voltage of 4.35V or more, preferably 4.35V to 5V, and more preferably 4.35V to 4.5V.

Advantageous Effects

A lithium secondary battery according to the present disclosure has a low thermal transfer rate of 4 Ah/sec or less, and thus, is excellent in thermal runaway safety since the propagation of flame and/or heat to neighboring cells occurs less even when thermal runaway occurs in one unit cell.

In addition, the lithium secondary battery according to the present disclosure having a high nominal voltage of 3.68V or more may have high energy density.

In addition, the lithium secondary battery according to the present disclosure is operated at a high voltage of 4.35 V or greater, and thus, may implement a high capacity even when a positive electrode active material with a relatively low nickel content is applied thereto.

In addition, since the lithium secondary battery according to the present disclosure has excellent thermal runaway safety, when a module is manufactured using the lithium secondary battery, it is not required to use a lot of fireproof insulation materials, so that relatively high energy density per volume may be implemented.

The lithium secondary battery according to the present disclosure may be designed to use a single particle-type positive electrode active material having a nickel content of 70 mol % or less, preferably 50 mol % to 70 mol % based on a total number of moles of metals excluding lithium as a positive electrode active material, and a carbon-based negative electrode active material as a negative electrode active material. As a result, the lithium secondary battery is excellent in thermal runaway safety due to a low thermal transfer rate, and also, is stably operated at a high voltage of 4.25 V or higher, thereby implementing high capacity.

The lithium secondary battery according to the present disclosure may be designed to have an electrolyte weight of 1.0 g/Ah to 3.0 g/Ah per unit capacity, and when the above electrolyte weight is satisfied, it is possible to suppress the increase in explosion pressure caused by the electrolyte which acts as a fuel during thermal runaway.

In addition, the lithium secondary battery according to the present disclosure adjusts the content of imide-based lithium salt in the electrolyte according to the Ni content of the positive electrode active material, thereby minimizing heat transfer to neighboring cells during thermal runaway.

BRIEF DESCRIPTION OF DRAWINGS

FIG. 1 is a scanning electron microscope photograph of a single particle positive electrode active material.

FIG. 2 is a scanning electron microscope photograph of a quasi-single particle positive electrode active material.

FIG. 3 is a scanning electron microscope photograph of a secondary particle positive electrode active material.

DETAILED DESCRIPTION OF THE PREFERRED EMBODIMENT

Hereinafter, the present disclosure will be described in more detail.

It will be understood that terms or words used in the present specification and claims shall not be construed as being limited to having meanings defined in commonly used dictionaries, but should be interpreted as having meanings and concepts consistent with the technical idea of the present disclosure based on the principle that an inventor may appropriately define concepts of the terms to best explain the invention.

In the present disclosure, the term "single-particle type" refers to a particle composed of 30 or fewer nodules, and is a concept including a single particle composed of one nodule and a quasi-single particle, which is a composite of 2 to 30 nodules. FIG. 1 shows a scanning electron microscope photo of a positive electrode active material in the form of a single particle, and FIG. 2 shows a scanning electron microscope photo of a positive electrode active material in the form of a quasi-single particle.

The "nodule" is a sub-particle unit constituting a single particle and a quasi-single particle, and may be a single crystal with no crystalline grain boundaries, or a polycrystal with no grain boundaries in appearance when observed with a field of view of 5000 to 20000 times using a scanning electron microscope.

In the present disclosure, a "secondary particle" refers to a particle formed by the agglomeration of a plurality of, for example, tens to hundreds of primary particles. Specifically, the secondary particle may be an agglomerate of 50 or more primary particles. FIG. 3 shows a scanning electron micrograph (SEM) of a positive electrode active material in the form of secondary particles.

In the present disclosure, the term "particle" is a concept including any one or all of a single particle, a quasi-single particle, a primary particle, a nodule, and a secondary particle.

In the present disclosure, the average particle diameter $D_{mean}$ of nodules or primary particles refers to an arithmetic mean value calculated after measuring the particle diameters of nodules or primary particles observed in a scanning electron microscope image.

In the present disclosure, the "average particle diameter $D_{50}$" refers to a particle size corresponding to 50% of a cumulative volume of the volume cumulative particle size distribution of powder to be measured, and may be measured using a laser diffraction method. For example, powder to be measured is dispersed in a dispersion medium, and then introduced into a commercially available laser diffraction particle size measurement device (e.g., Microtrac MT 3000) to be irradiated with an ultrasonic wave of about 28 kHz to an output of 60 W. Thereafter, the average particle diameter may be measured by obtaining a volume cumulative particle size distribution graph, and then obtaining a particle size corresponding to 50% of a cumulative volume.

In the present disclosure, a "loading amount (mnAh/cm$^2$)" may be measured as follows.

First, an electrode to be measured is punched to a unit area size, and then a weight W1 thereof is measured. Thereafter, a weight W2 of an electrode current collector is measured in the punched electrode, and then a weight W of an electrode active material layer is calculated through Equation 3 below:

Equation 3: Weight $W$ of electrode active material layer=(weight $W1$ of electrode per unit area−weight $W2$ of electrode current collector per unit area)/2

Thereafter, a weight Wa of an electrode active material per unit area may be calculated by multiplying the weight W of the electrode active material layer by the weight ratio of the electrode active material to the total weight of the electrode active material layer, and a loading amount may be calculated by multiplying the Wa by the specific capacity (unit: mAh) of the corresponding electrode active material.

In the present disclosure, the "porosity (%)" may be calculated as 1−(electrode density/electrode true density).

As a result of repeated research to develop a lithium secondary battery with high energy density and excellent safety, the present inventors have found that when a lithium secondary battery is designed to satisfy specific conditions of the thermal transfer rate measured in a test module manufactured by stacking four lithium secondary batteries, it is possible to minimize thermal runaway propagation to neighboring cells even when thermal runaway occurs in a unit cell in a module and/or pack state, and to implement high energy density, and have completed the present disclosure.

Specifically, the lithium secondary battery according to the present disclosure is a lithium secondary battery which includes a positive electrode including a positive electrode active material, a negative electrode including a negative electrode active material, and an electrolyte, wherein the lithium secondary battery has a nominal voltage of 3.68 V or greater, and $V_T$ represented by Equation (1) below measured after manufacturing a test module by stacking four of the lithium secondary battery fully charged by being charged to 4.35 V is 4 Ah/sec or less, preferably 1 Ah/sec to 4 Ah/sec, and more preferably 2 Ah/sec to 4 Ah/sec.

$$V_T = C_{total}/t \qquad \text{Equation(1)}$$

In Equation (1) above, $C_{total}$ is a total discharge capacity of the test module, and t is the time taken, after one lithium secondary battery disposed at the outermost periphery of the test module is heated so as to be ignited, from a point of time at which the voltage of the lithium secondary battery disposed at the outermost periphery becomes 0 until a point of time at which the voltage of all lithium secondary batteries in the test module becomes 0.

When thermal runaway occurs, the voltage of a unit cell (lithium secondary battery) drops to 0, so that the t represents the time taken until the thermal runaway occurred in the outermost unit cell propagates to all unit cells in a test cell.

Meanwhile, the total discharge capacity of the test module ($C_{total}$) is the sum of discharge capacities measured by charging and discharging each lithium secondary battery in the test module in the voltage range of 2.5 V to 4.35 V at 0.33 C at 25 degrees C.

The lithium secondary battery in test module may have, for example, but is not limited to, an overall width of 50 mm to 300 mm, an overall length of 50 mm to 1,000 mm and a thickness of 2 mm to 40 mm, preferably an overall width of 50 mm to 200 mm, an overall length of 100 mm to 800 mm and a thickness of 2 mm to 30 mm, more preferably an overall width of 50 mm to 200 mm, an overall length of 200 mm to 500 mm and a thickness of 5 mm to 15 mm. According to an embodiment, the lithium secondary battery in test module may have an overall width of 100 mm, an overall length of 300 mm and a thickness of 8.5 mm.

The $V_T$ is a value obtained by dividing the discharge capacity of the entire test module by the time taken for thermal runaway to propagate throughout the test module, and is a value which can represent the thermal transfer rate during thermal runaway. Meanwhile, as the dimensions of the test module increase, the capacity and thermal propagation time of the test module also increase, so $V_T$ does not depend on the dimensions of the test module.

In addition, heating of the lithium secondary battery can be performed by attaching a 260 mm×90 mm mica heater connected to a PID controller (Proportional Integral Derivative controller) to the lithium secondary battery and heating it with an output of 300 W.

According to research by the present inventors, it has been found that when a battery module or battery pack is manufactured using a lithium secondary battery designed such that the $V_T$ measured by manufacturing a test module is 4 Ah/sec or less, the rate of heat and/or flame propagation to neighboring cells significantly decreases, so that it is possible to maximally suppress the occurrence of successive fires and/or explosions even when thermal runaway occurs in one unit cell.

Meanwhile, the $V_T$ is affected by the discharge capacity of a lithium secondary battery, the design of a positive electrode (e.g., the type of a positive electrode active material, the positive electrode composition, and the loading amount, etc.), the design of a negative electrode (e.g., the type of a negative electrode active material, the negative electrode composition, and the loading amount, etc.) and/or the design of an electrolyte (e.g., the electrolyte content, the type of a lithium salt, the lithium salt content, the type of an additive, etc.). For example, when the content of a positive electrode active material with a high nickel content increases in a positive electrode, or when a negative electrode includes a Si-based negative electrode active material, the $V_T$ increases. In addition, when the capacity of a lithium secondary battery increases or the amount of an electrolyte in the lithium secondary battery increases, the $V_T$ also increases. Therefore, when designing a lithium secondary battery, it is possible to manufacture a lithium secondary battery having a desired $V_T$ value by appropriately adjusting the above factors.

Meanwhile, the lithium secondary battery may have a nominal voltage of 3.68V or more, preferably 3.68V to 3.80V, and more preferably 3.69V to 3.75V. According to an embodiment, the nominal voltage refers to the average voltage value when discharging the lithium secondary battery. Since the energy density of a lithium secondary battery is calculated as the product of the average voltage and average current during discharge, the energy density increases when the nominal voltage is high. The nominal voltage of a conventional lithium secondary battery using lithium nickel cobalt manganese-based oxide as a positive electrode active material was around 3.6V since a charging cut-off voltage of the conventional lithium secondary is around about 4.25 V. However, in the present disclosure, high energy density can be achieved by increasing the charge cut-off voltage to 4.35V or more so that the nominal voltage of the secondary battery is 3.68V or more. Specifically, the lithium secondary battery according to the present disclosure may have an energy density of 500 Wh/L or more, preferably 500 Wh/L to 800 Wh/L.

It is preferable that the lithium secondary battery has a charge cut-off voltage of 4.35 V or higher, preferably 4.35 V to 5 V, and more preferably 4.35 V to 4.5 V when operated. When the charge cut-off voltage satisfies the above range, high energy density can be achieved since the capacity of active material and nominal voltage of the battery increase. Generally, as the charging cut-off voltage increases, the capacity generated from the positive electrode active material increases. However, when the charging cut-off voltage becomes higher, side reactions with an electrolyte solution occur more during charging and discharging, and the structural collapse of a positive electrode active material rapidly occurs, so that there is a problem in that lifespan properties are rapidly deteriorated. The problem as described above is more prominent in a high-nickel-based lithium nickel-cobalt-manganese-based oxide with a high nickel content. Therefore, typically, when a lithium nickel-cobalt-manganese-based oxide is used as a positive electrode active material, a charging cut-off voltage of about 4.25V has been commonly used. However, according to the present disclosure, by using a positive electrode active material including a lithium nickel-based oxide composed of a single particle having a Ni content of 70 mol % or less, it is possible to maintain excellent lifespan properties even when charging cut-off voltage is 4.35 V or higher.

The present disclosure also relates to a lithium secondary battery comprising: a positive electrode including a positive electrode active material; a negative electrode including a negative electrode active material; and an electrolyte, wherein the positive electrode active material includes 50 wt % or greater of a single particle-type lithium nickel-based oxide having a Ni content of 70 mol % or less based on all metals excluding lithium relative to a total weight of the positive electrode active material.

Hereinafter, each component of the lithium secondary battery according to the present disclosure will be described in more detail.

Positive Electrode

The lithium secondary battery according to the present disclosure includes a positive electrode including a positive electrode active material. Specifically, the positive electrode includes a positive electrode current collector, and a positive electrode active material layer formed on at least one surface of the positive electrode current collector, wherein the positive electrode active material layer includes the positive electrode active material. In addition, the positive electrode active material layer may further include a positive electrode conductive material and a positive electrode binder in addition to the positive electrode active material.

The positive electrode current collector is not particularly limited as long as it has conductivity without causing a chemical change in a battery, and for example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion of the positive electrode active material. For example, the positive electrode current collector may be used in various forms such as a film, a sheet, a foil, a net, a porous body, a foam, a non-woven body, and the like.

Meanwhile, in the present disclosure, the positive electrode active material may include a single particle-type lithium nickel-based oxide having a Ni content of 70 mol % or less, preferably 50 mol % to 70 mol %.

When a single particle-type lithium nickel-based oxide having a relatively low nickel content is used as a positive electrode active material as described above, side reactions with an electrolyte solution are suppressed under high temperature and high voltage conditions, resulting in reduced gas generation, and as a result, the explosion pressure decreases during thermal runaway, thereby decreasing the rate of heat and/or flame transfer to neighboring cells.

In the case of a lithium nickel-based oxide in the form of a secondary particle in which forty to hundreds of primary particles are agglomerated, side reactions with an electrolyte solution occur a lot due to a large contact area with the electrolyte solution, and a gas is generated during the side reaction process. The amount of gas generation significantly increases under high temperature and/or high voltage conditions, and when there is a large amount of gas included in the lithium secondary battery, the explosion pressure increases during thermal runaway, and the higher the explosion pressure, the faster the heat or flame propagates to neighboring cells. In comparison, a single particle-type lithium nickel-based oxide has a small number of nodules constituting the particle, and therefore has a small interface between the particles, resulting in a small contact area with an electrolyte solution, so that side reactions with the electrolyte solution occur less than those of a secondary particle, and accordingly, the amount of gas generation is significantly small. Therefore, when a single particle-type lithium nickel-based oxide is applied as a positive electrode active material, the explosion pressure decreases during thermal runaway, thereby decreasing the thermal transfer rate. However, even when a single particle-type lithium nickel-based oxide is applied, when the nickel content in the lithium nickel-based oxide is high, the reduction in the amount of gas generation is small, and accordingly, the effect of decreasing the explosion pressure during thermal runaway and the thermal transfer rate is reduced.

In addition, in the case of a single particle-type lithium nickel-based oxide having a relatively low nickel content, the structural stability at a high voltage is higher than that of a lithium nickel-based oxide having a high nickel content or in the form of a secondary particle, so that the degradation in lifespan properties during high voltage operation may be minimized. Specifically, as the nickel content in a lithium nickel-based oxide increases, $Ni^{+4}$ ions having high reactivity increases, and as a result, the structural stability of a positive electrode active material is reduced during charging and discharging, so that a positive electrode is rapidly deteriorated. The above phenomenon is further exacerbated during high voltage operation. Therefore, in the present disclosure, a lithium nickel-based oxide having a Ni content of 70 mol % or less is applied to suppress the degradation in lifespan due to active material deterioration during high voltage operation. However, when the Ni content is too small, capacity properties are degraded, so that it is preferable that the Ni content of the lithium nickel-based oxide is about 50 mol % to about 70 mol %.

Specifically, the single particle-type lithium nickel-based oxide may be a lithium transition metal oxide including nickel, manganese, and cobalt, and may be, for example, represented by [Formula 1] below:

$$Li_{1+x}[Ni_aCo_bMn_cM^1d]O_2 \qquad \text{[Formula 1]}$$

wherein, $M^1$ may include one or two or more elements of Ti, Mg, Al, Zr, Y, Ba, Ca, Sr, W, Ta, Nb, or Mo. When the $M^1$ element is included, the structural stability of lithium nickel-based oxide particles is improved, so that better lifespan properties may be implemented during high voltage operation. Preferably, the $M^1$ element may include one or more of Ti, Mg, Al, Zr, or Y, and more preferably, may include two or more of Ti, Mg, Al, Zr or Y.

The 1+x represents the lithium molar ratio in the lithium nickel-based oxide, wherein it may be that $-0.1 \leq x \leq 0.1$, $0 \leq x \leq 0.1$, or $0 \leq x \leq 0.07$. When 1+x satisfies the above range, a stable layered crystal structure may be formed.

The a represents the molar ratio of nickel in all metals except lithium in the lithium nickel-based oxide, wherein it may be that $0.5 \leq a \leq 0.7$, $0.55 \leq a \leq 0.7$, or $0.55 \leq a \leq 0.65$. When the a satisfies the above range, stable operation may be achieved at a high voltage, thereby implementing a high capacity, and the explosion pressure decreases during thermal runaway, resulting in excellent thermal runaway safety.

The b represents the molar ratio of cobalt in all metals except lithium in the lithium nickel-based oxide, wherein it may be that $0<b<0.5$, $0.05 \leq b \leq 0.4$, or $0.1 \leq b \leq 0.4$.

The c represents the molar ratio of manganese in all metals except lithium in the lithium nickel-based oxide, wherein it may be that $0<c<0.5$, $0.05 \leq c \leq 0.4$, or $0.1 \leq c \leq 0.4$.

The d represents the molar ratio of the $M^1$ element in all metals except lithium in the lithium nickel-based oxide, wherein it may be that $0 \leq d \leq 0.2$, $0 \leq d \leq 0.1$, or $0 \leq d \leq 0.1$. When the molar ratio of the $M^1$ element satisfies the above range, both the structural stability and the capacity of the positive electrode active material may be excellent.

Meanwhile, the single particle-type lithium nickel-based oxide may further include a coating layer on the surface thereof, wherein the coating layer includes one or more elements of Ti, Mg, Al, Zr, Y, Ba, Ca, Sr, W, Ta, Nb, or Mo.

When there is a coating layer present on the surface of a lithium nickel-based oxide, the contact between an electrolyte and the lithium nickel-based oxide is suppressed by the coating layer, and as a result, there may be an effect of reducing transition metal elution or gas generation due to a side reaction with the electrolyte, and accordingly, safety may be further improved during thermal runaway. Preferably, the coating layer may include two or more elements of Ti, Mg, Al, Zr, Y, Ba, Ca, Sr, W, Ta, Nb, or Mo, and more preferably, may include two or more elements of Ti, Mg, Al, Zr, Y, or W.

Meanwhile, it is preferable that the single particle-type lithium nickel-based oxide includes 30 or fewer, preferably 1 to 25, and more preferably 1 to 15 nodules. This is because when the number of nodules constituting the lithium nickel-based oxide is greater than 30, particle breakage increases during electrode manufacturing, and internal cracking increases due to volume expansion/contraction of nodules during charging and discharging, so that an effect of improving high-temperature lifespan properties and high-temperature storage properties may be degraded.

Meanwhile, the nodule may have an average particle diameter of 0.8 μm to 4.0 μm, preferably 0.8 μm to 3 μm, and more preferably 1.0 μm to 3.0 μm. When the average particle diameter of the nodules satisfies the above range, particle breakage is minimized during electrode manufacturing, and resistance increase may be more effectively suppressed. According to an embodiment, the average particle diameter of the nodules refers to a value obtained by measuring the particle diameter of each nodule observed in an SEM image obtained by analyzing positive electrode active material powder with a scanning electron microscope, and then calculating an arithmetic mean value of the measured values.

Meanwhile, the lithium nickel-based oxide may have a $D_{50}$ of 2.0 μm to 10.0 μm, preferably 2.0 μm to 8.0 μm. More preferably, it is preferable that the $D_{50}$ is about 3.0 μm to about 7.0 μm. When the $D_{50}$ of the lithium nickel-based oxide is too small, processability is reduced during electrode manufacturing, and electrolyte solution wettability may be reduced, thereby increasing electrochemical properties, and when the $D_{50}$ is too large, there is a problem in that resistance increases and output properties are degraded.

Meanwhile, the single particle-type lithium nickel-based oxide having a nickel content of 70 mol % or less may be included in an amount of greater than 50 wt %, preferably 55 wt % or greater, more preferably 60 wt % or greater, more preferably 70 wt % or greater, and most preferably 100 wt % of the total positive electrode active material in the positive electrode active material layer. When the ratio of the single particle-type lithium nickel-based oxide having a nickel content of 70 mol % or less in the total weight of the positive electrode active material satisfies the above range, excellent thermal runaway safety is exhibited.

The positive electrode active material layer may partially include, as the positive electrode active material, a positive electrode active material other than the single particle-type lithium nickel-based oxide having a nickel content of 70 mol % or less, that is, a lithium nickel-based oxide in the form of a secondary particle and/or a single particle-type lithium nickel-based oxide having a nickel content of greater than 70 mol %, but if the ratio of the secondary particle and/or the lithium nickel-based oxide having a nickel content of greater than 70 mol % is greater than 50 wt % in the total positive electrode active material, the effect of improving thermal runaway safety is insignificant, which is not desirable.

Meanwhile, the positive electrode active material may be included in an amount of 80 wt % to 98 wt %, preferably 90 wt % to 98 wt %, and more preferably 93 wt % to 98 wt % based on the total weight of the positive electrode active material layer. When the content of the positive electrode active material satisfies the above range, excellent energy density may be implemented.

Next, the positive electrode conductive material is used to impart conductivity to a positive electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, carbon fiber, and a carbon nanotube; metal powder or metal fiber of such as copper, nickel, aluminum, and silver; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used.

Typically, the positive electrode conductive material may be included in an amount of 0.1 wt % to 10 wt %, preferably 0.5 wt % to 8 wt %, and more preferably 0.5 wt % to 5 wt % based on the total weight of the positive electrode active material layer.

Next, the positive electrode binder serves to improve the bonding between positive electrode active material particles and the adhesion between the positive electrode active material and the positive electrode current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM) rubber, a sulfonated-EPDM, styrene butadiene rubber (SBR), fluorine rubber, or various copolymers thereof, and any one thereof or a mixture of two or more thereof may be used.

The positive electrode binder may be included in an amount of 1 wt % to 10 wt %, preferably 1 wt % to 8 wt %, and more preferably 1 wt % to 5 wt % based on the total weight of the positive electrode active material layer.

The positive electrode may be manufactured according to a typical method for manufacturing a positive electrode. For example, the positive electrode may be manufactured by preparing a positive electrode slurry by mixing a positive electrode active material, a positive electrode binder and/or a positive electrode conductive material in a solvent, and applying, followed by drying and roll-pressing, the positive electrode slurry on a positive electrode current collector, or by casting the positive electrode slurry on a separate support, and then laminating, on a positive electrode current collector, a film peeled off the support.

Meanwhile, as the solvent of the positive electrode slurry, solvents commonly used in the art may be used, and for example, dimethyl sulfoxide (DMSO), isopropyl alcohol, N-methylpyrrolidone (NMP), acetone, water, and the like may be used alone, or two or more thereof may be mixed and used. The amount of the solvent to be used is sufficient if the solvent dissolves or disperses the positive electrode active material, the conductive material, and the binder in consideration of an applying thickness and a manufacturing yield of a slurry, and thereafter, allows the slurry to have a viscosity capable of exhibiting excellent thickness uniformity when applied for manufacturing the positive electrode.

Meanwhile, the positive electrode according to the present disclosure may have a loading amount of 0.5 mAh/cm$^2$ to 10 mAh/cm$^2$, preferably 2 mAh/cm$^2$ to 8 mAh/cm$^2$, and more preferably 2.5 mAh/cm$^2$ to 6 mAh/cm$^2$. When the positive electrode loading amount satisfies the above range, thermal runaway safety and capacity properties are more excellent.

In addition, the positive electrode may have a porosity of 10% to 50%, preferably 15% to 45%, and more preferably 15% to 30%. When the positive electrode porosity satisfies the above range, electrolyte wettability is improved to implement more excellent capacity properties.

Negative Electrode

The lithium secondary battery according to the present disclosure includes a negative electrode including a negative electrode active material. Specifically, the negative electrode includes a negative electrode current collector, and a negative electrode active material layer formed on at least one surface of the negative electrode current collector, wherein the negative electrode active material layer includes the negative electrode active material. In addition, the negative electrode active material layer may further include a negative electrode conductive material and a negative electrode binder in addition to the negative electrode active material.

The negative electrode current collector is not particularly limited as long as it has high conductivity without causing a chemical change in a battery, and for example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3 μm to 500 μm, and as in the case of the positive electrode current collector, microscopic irregularities may be formed on the surface of the negative electrode current collector to improve the adhesion of the negative electrode active material. For example, the negative electrode current collector may be used in various forms such as a film, a sheet, a foil, a net, a porous body, a foam, a non-woven body, and the like.

Meanwhile, the negative electrode active material may be composed of a carbon-based negative electrode active material, and the carbon-based negative electrode active material may include, for example, natural graphite, artificial graphite, graphitized carbon fiber, amorphous carbon, soft carbon, hard carbon, or a combination thereof. More preferably, the carbon-based negative electrode active material may include natural graphite and artificial graphite, in which case the weight ratio of the natural graphite and the artificial graphite may be 1:9 to 9:1, preferably 2:8 to 8:2.

In recent years, there has been a trend in which a Si-based negative electrode active material such as SiO, Si, an Si—C composite, or the like which has high theoretical capacity is used as a negative electrode active material, but according to the research of the present inventors, it has been found that when a Si-based negative electrode active material is included, the explosion pressure increases during thermal runaway, and as a result, the thermal propagation rate increases, thereby reducing thermal runaway safety. Therefore, it is preferable that the lithium secondary battery according to the present disclosure does not include a Si-based negative electrode active material as the negative electrode active material.

The carbon-based negative electrode active material may have an average particle diameter $D_{50}$ of 2 μm to 30 μm, preferably 5 μm to 30 μm.

The negative electrode active material may be included in an amount of 80 wt % to 98 wt %, preferably 90 wt % to 98 wt %, and more preferably 93 wt % to 98 wt % based on the total weight of the negative electrode active material layer.

When the content of the negative electrode active material satisfies the above range, excellent energy density may be implemented.

Next, the negative electrode conductive material is used to impart conductivity to a negative electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, carbon fiber, and a carbon nanotube; metal powder or metal fiber of such as copper, nickel, aluminum, and silver; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used.

Typically, the negative electrode conductive material may be included in an amount of 0.1 wt % to 10 wt %, preferably 0.25 wt % to 8 wt %, and more preferably 0.25 wt % to 5 wt % based on the total weight of the negative electrode active material layer.

The negative electrode binder serves to improve the bonding between negative electrode active material particles and the adhesion between the negative electrode active material and the negative electrode current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene—butadiene rubber (SBR), fluorine rubber, or various copolymers thereof, and any one thereof or a mixture of two or more thereof may be used.

The negative electrode binder may be included in an amount of 1 wt % to 10 wt %, preferably 1 wt % to 8 wt %, and more preferably 1 wt % to 5 wt % based on the total weight of the negative electrode active material layer.

Meanwhile, in the present disclosure, the negative electrode active material layer may have a single-layered structure, or may have a multi-layered structure of two or more layers. For example, the negative electrode may include a first negative electrode active material layer formed on the negative electrode current collector, and including a first negative electrode active material, and a second negative electrode active material layer formed on the first negative electrode active material layer, and including a second negative electrode active material. According to an embodiment, the first negative electrode active material and the second negative electrode active material may each be composed of a carbon-based negative electrode active material, and may each be, for example, natural graphite, artificial graphite, or a combination thereof.

Meanwhile, when the negative electrode active material layer has the multi-layered structure composed of two or more layers, each layer may have different types and/or contents of a negative electrode active material, a binder, and/or a conductive material.

For example, the weight ratio of natural graphite to the total weight of the negative electrode active material in the first negative electrode active material layer (lower layer) may be formed to be higher than the weight ratio of natural graphite to the total weight of the negative electrode active material in the second negative electrode active material layer (upper layer), and the weight ratio of artificial graphite to the total weight of the negative electrode active material in the second negative electrode active material layer may be formed to be higher than the weight ratio of the artificial graphite to the total weight of the negative active material in the first negative electrode active material layer.

Alternatively, the weight ratio of the conductive material to the total weight of the second negative electrode active material layer (the upper layer) may be formed to be higher than the weight ratio of the conductive material to the total weight of the first negative electrode active material layer (the lower layer).

By forming the negative electrode active material layer in a multi-layered structure as described above, and by varying the composition of each layer, it is possible to improve the performance properties of a battery. For example, when the ratio of natural graphite is formed to be high in the first positive electrode active material layer and the ratio of artificial graphite is formed to be high in the second positive electrode active material layer, the effect of decreasing the rate of thermal transfer during thermal runaway may be further improved.

The negative electrode may be manufactured according to a typical method for manufacturing a negative electrode. For example, the negative electrode may be manufactured by preparing a negative electrode slurry by mixing a negative electrode active material, a negative electrode binder and/or a negative electrode conductive material in a solvent, and applying, followed by drying and roll-pressing, the negative electrode slurry on a negative electrode current collector, or by casting the negative electrode slurry on a separate support, and then laminating, on a negative electrode current collector, a film peeled off the support.

Meanwhile, as the solvent of the negative electrode slurry, solvents commonly used in the art may be used, and for example, dimethyl sulfoxide (DMSO), isopropyl alcohol, N-methylpyrrolidone (NMP), acetone, water, and the like may be used alone, or two or more thereof may be mixed and used. The amount of the solvent to be used is sufficient if the solvent dissolves or disperses the negative electrode active material, the conductive material, and the binder in consideration of an applying thickness and a manufacturing yield of a slurry, and thereafter, allows the slurry to have a viscosity capable of exhibiting excellent thickness uniformity when applied for manufacturing the negative electrode.

Meanwhile, the negative electrode according to the present disclosure may have a loading amount of 0.5 mAh/cm$^2$ to 10 mAh/cm$^2$, preferably 2 mAh/cm$^2$ to 8 mAh/cm$^2$, and more preferably 2.5 mAh/cm$^2$ to 6 mAh/cm$^2$. When the negative electrode loading amount satisfies the above range, thermal runaway safety and capacity properties are more excellent.

In addition, the negative electrode may have a porosity of 15% to 50%, preferably 20% to 40%, and more preferably 20% to 35%. When the negative electrode porosity satisfies the above range, more excellent capacity properties may be implemented.

Electrolyte

The electrolyte may include an organic solvent and a lithium salt.

Any organic solvent may be used as the organic solvent without particular limitation as long as it may serve as a medium through which ions involved in an electrochemical reaction of the battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among the above, a carbonate-based solvent is preferred, and a mixture of a cyclic carbonate (e.g., ethylene carbonate or propylene carbonate) having high ionic conductivity and high permittivity, which may increase charge/discharge performance of the battery, and a low-viscosity linear carbonate-based compound (e.g., ethylmethyl carbonate, dimethyl carbonate, or diethyl carbonate) is more preferred.

As the lithium salt, any compound may be used without particular limitation as long as it can provide lithium ions used in a lithium secondary battery. Specifically, the lithium salt may include at least one of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)2$, $LiN(C_2F_5SO_2)2$, $LiN(CF_3SO_2)2$ (LiFSI), LiCl, LiI, or $LiB(C_2O_4)_2$. Preferably, the lithium salt may include a phosphoric acid-based lithium salt such as $LiPF_6$, an imide-based lithium salt such as $LiN(C_2F_5SO_3)_2$, $LiN(C_2F_5SO_2)_2$, $LiN(CF_3SO_2)_2$, or a combination thereof. According to an embodiment, the content of the imide-based lithium salt in the total weight of the lithium salt can be appropriately adjusted depending on the Ni content in the positive electrode active material. Specifically, the content WI of the imide-based lithium salt in the total weight of the lithium salt is expressed by the following equation (2):

$$0 \le W_1 \le \frac{40.01}{1+\exp\left(\frac{a-69.9999}{1.2}\right)} \quad (2)$$

wherein a is mol % Ni based on all metals excluding lithium of the positive electrode active material, and a may be 70 or less, preferably 50 to 70, and more preferably 55 to 70.

When a which is Ni contents of all metals excluding lithium of the positive electrode active material and $W_I$ which is the content of imide-based lithium salt among the total lithium salts contained in the electrolyte satisfy the condition of equation (2), the propagation of flame and/or heat to neighboring cells during thermal runaway can be minimized.

Meanwhile, the lithium salt may be used in the concentration range of 0.1 M to 3.0 M, preferably 0.1 M to 2.0 M, and more preferably 0.5 M to 1.5 M. When the concentration of the lithium salt is in the above range, the electrolyte has suitable conductivity and viscosity, thereby exhibiting excellent performance, and lithium ions may effectively move.

For purposes of improving the lifespan properties of a battery, suppressing the reduction in battery capacity, improving the discharge capacity of the battery, and the like, the electrolyte may further include an additive in addition to the above electrolyte components. For example, as the additive, various additives used in the art, such as fluoro ethylene carbonate (FEC), vinylene carbonate (VC), vinyl ethylene carbonate (VEC), ethylene sulfate (ESa), lithium difluorophosphate ($LiPO_2F_2$), lithium bisoxalato borate (Li-BOB), lithium tetrafluoro borate ($LiBF_4$), lithium difluorooxalato borate (LiDFOB), lithium difluorobisoxalatophosphate (LiDFBP), lithium tetrafluorooxalato phosphate (LiTFOP), lithium methyl sulfate (LiMS), lithium ethyl sulfate (LiES), propanesultone (PS), propensultone (PRS), succinonitrile (SN), adiponitrile (AND), 1,3,6-hexanetricarbonitrile (HTCN), 1,4-dicyano-2-butene (DCB), fluorobenzene (FB), ethyldi(pro-2-y-1-yl)phosphate (EDP), 5-methyl-5-propagyloxylcarbonyl-1,3-dioxane-2-one (MPOD), and the like may be used alone or in combination, but the additive is not limited thereto. The additive may be included in an amount of 0.1 wt % to 10 wt %, preferably 0.1 wt % to 5 wt %, based on the total weight of the electrolyte.

Meanwhile, the electrolyte may be included in an amount of 1.0 g/Ah to 3.0 g/Ah, preferably 1.5 g/Ah to 2.5 g/Ah, and more preferably 1.8 g/Ah to 2.5 g/Ah per unit capacity of the lithium secondary battery. If the amount of the electrolyte per unit capacity is too large, the electrolyte acts as a fuel during thermal runaway, thereby increasing the explosion pressure, and as a result, thermal transfer may rapidly occur. Meanwhile, if the amount of the electrolyte per unit capacity is too small, the electrolyte is rapidly consumed during activation and battery operation processes, so that lifespan properties may be degraded.

Separator

The lithium secondary battery according to the present disclosure may include, if necessary, a separator between the positive electrode and the negative electrode. The separator is to separate the negative electrode and the positive electrode and to provide a movement path for lithium ions, and may be used without particular limitation as long as it is a separator commonly used in a lithium secondary battery, and particularly, a separator having high moisture-retention ability for an electrolyte as well as low resistance to the movement of electrolyte ions is preferred. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a stacked structural body having two or more layers thereof may be used. Also, a typical porous non-woven fabric, for example, a non-woven fabric formed of glass fiber having a high melting point, polyethylene terephthalate fiber, or the like may be used. Also, a coated separator including a ceramic component or a polymer material may be used to secure heat resistance or mechanical strength, and may selectively be used in a single-layered or multi-layered structure.

The lithium secondary battery according to the present disclosure may be usefully applied in portable devices such as mobile phones, laptop computers, digital cameras, and the like, and in the field of electric cars such as a hybrid electric vehicle (HEV), and the like. The lithium secondary battery according to the present disclosure is operated at a high voltage, and thus, may implement high energy density, and is excellent in safety during thermal runaway, and thus, may be particularly usefully used in the field of electric vehicles.

According to another embodiment of the present disclosure, a battery module including the lithium secondary battery according to the present disclosure as a unit cell, and a battery pack including a plurality of the battery modules are provided.

According to another embodiment of the present disclosure, a battery pack including a plurality of the lithium secondary batteries according to the present disclosure as unit cells are also provided. The battery pack may not include any battery modules.

The present disclosure also relates to a pack cell assembly. According to an embodiment, a battery module may comprise between 10 and 50 unit cells, preferably between 16 and 36 unit cells. A battery pack may comprise between 10 and 1,000 unit cells, preferably between 10 and 500 unit cells.

The battery module or the battery pack may be used as a power source of one or more medium-and-large-sized devices such as a power tool, an electric car including an electric vehicle (EV), a hybrid electric vehicle (HEV), and a plug-in hybrid electric vehicle (PHEV), or a power storage system.

Hereinafter, embodiments of the present disclosure will be described in detail so that those skilled in the art may easily carry out the present disclosure. However, the present disclosure may be embodied in many different forms, and is not limited to the embodiments set forth herein. The present disclosure is described in the claims.

EXAMPLES

Example 1

<Manufacturing of Positive Electrode>

A positive electrode active material:a positive electrode conductive material:a PVDF binder were mixed in N-methylpyrrolidone at a weight ratio of 97:1:2 to prepare a positive electrode slurry. 100% of a single particle-type $Li[Ni_{0.56}Co_{0.12}Mn_{0.32}]O_2$ having a $D_{50}$ of 4.0 μm was used as the positive electrode active material, and carbon nanotubes were used as the positive electrode conductive material.

The positive electrode slurry was applied on an aluminum current collector sheet, dried, and then roll-pressed to manufacture a positive electrode having a loading amount of 4.0 mAh/cm$^2$, and a porosity of 25%.

<Manufacturing of Negative Electrode>

A negative electrode active material:a negative electrode conductive material styrene-butadiene rubber (SBR):carboxymethyl cellulose (CMC) were mixed in water at a weight ratio of 96:1:2:1 to prepare a negative electrode slurry. Graphite was used as the negative electrode active material, and carbon black was used as the negative electrode conductive material.

The negative electrode slurry was applied on a copper current collector sheet, dried, and then roll-pressed to manufacture a negative electrode having a loading amount of 4.5 mAh/cm$^2$, and a porosity of 30%.

<Manufacturing of Lithium Secondary Battery>

A lithium secondary battery cell was manufactured by interposing a separator between the positive electrode and the negative electrode manufactured as described above to manufacture an electrode assembly, inserting the electrode assembly into a battery case, and then injecting an electrolyte thereto such that the electrolyte amount was 2.0 g/Ah per unit capacity. The lithium secondary battery cells have an overall width of 100 mm, an overall length of 300 mm and a thickness of 8.5 mm.

As the electrolyte, an electrolyte prepared by dissolving 1.0 M of lithium salt(LiPF$_6$ 100%) in a mixed solvent in which ethylene carbonate (EC):ethyl methyl carbonate (EMC) were mixed at a volume ratio of 3:7.

Example 2

A positive electrode, a negative electrode, and a lithium secondary battery were manufactured in the same manner as in Example 1, except that 100% of a single particle-type $Li[Ni_{0.60}Co_{0.10}Mn_{0.30}]O_2$ having a $D_{50}$ of 3.7 μm was used as the positive electrode active material.

Example 3

A positive electrode, a negative electrode, and a lithium secondary battery were manufactured in the same manner as in Example 1, except that 100% of a single particle-type $Li[Ni_{0.70}Co_{0.10}Mn_{0.20}]O_2$ having a $D_{50}$ of 3.6 μm was used as the positive electrode active material.

Example 4

A positive electrode, a negative electrode, and a lithium secondary battery were manufactured in the same manner as in Example 1, except that LiPF$_6$:LiFSI was used as a lithium salt mixed at a weight ratio of 60:40 when manufacturing the lithium secondary battery.

Example 5

A positive electrode, a negative electrode, and a lithium secondary battery were manufactured in the same manner as in Example 2, except that LiPF$_6$:LiFSI was used as a lithium salt mixed at a weight ratio of 60:40 when manufacturing the lithium secondary battery.

Example 6

A positive electrode, a negative electrode, and a lithium secondary battery were manufactured in the same manner as in Example 3, except that LiPF$_6$:LiFSI was used as a lithium salt mixed at a weight ratio of 80:20 when manufacturing the lithium secondary battery.

Comparative Example 1

A positive electrode, a negative electrode, and a lithium secondary battery were manufactured in the same manner as in Example 1, except that 100% of a secondary particle-type $Li[Ni_{0.85}Co_{0.06}Mn_{0.05}Al_{0.01}]O_2$ having a $D_{50}$ of 8.6 μm was used as the positive electrode active material.

Comparative Example 2

A positive electrode, a negative electrode, and a lithium secondary battery were manufactured in the same manner as in Example 1, except that 100% of a single particle-type $Li[Ni_{0.56}Co_{0.05}Mn_{0.05}Al_{0.01}]O_2$ having a $D_{50}$ of 3.6 μm was used as the positive electrode active material.

Comparative Example 3

A positive electrode, a negative electrode, and a lithium secondary battery were manufactured in the same manner as in Example 1, except that 100% of a single particle-type $Li[Ni_{0.56}Co_{0.05}Mn_{0.05}Al_{0.01}]O_2$ having a $D_{50}$ of 3.6 μm was used as the positive electrode active material, and graphite: SiO were mixed at a weight ratio of 95:5 and used as the negative electrode active material.

Comparative Example 4

A positive electrode, a negative electrode, and a lithium secondary battery were manufactured in the same manner as in Example 1, except that 100% of a single particle-type Li[Ni$_{0.93}$Co$_{0.05}$Mn$_{0.01}$Al$_{0.01}$]O$_2$ having a D$_{50}$ of 3.3 μm was used as the positive electrode active material.

Comparative Example 5

A positive electrode, a negative electrode, and a lithium secondary battery were manufactured in the same manner as in Example 1, except that a single particle-type Li[Ni$_{0.60}$Co$_{0.10}$Mn$_{0.30}$]O$_2$ having a D$_{50}$ of 3.7 μm and a secondary particle-type Li[Ni$_{0.50}$Co$_{0.10}$Mn$_{0.10}$]O$_2$ having a D$_{50}$ of 8.6 were mixed at a weight ratio of 5:5 and used as the positive electrode active material.

Comparative Exmaple 6

A positive electrode, a negative electrode, and a lithium secondary battery were manufactured in the same manner as in Example 1, except that a single particle-type Li[Ni$_{0.70}$Co$_{0.10}$Mn$_{0.20}$]O$_2$ having a D$_{50}$ of 3.6 μm and a secondary particle-type Li[Ni$_{0.70}$Co$_{0.10}$Mn$_{0.20}$]O$_2$ having a D$_{50}$ of 7.8 μm were mixed at a weight ratio of 5:5 and used as the positive electrode active material.

Comparative Exmaple 7

A positive electrode, a negative electrode, and a lithium secondary battery were manufactured in the same manner as in Example 1, except that a single particle-type Li[Ni$_{0.70}$Co$_{0.10}$Mn$_{0.20}$]O$_2$ having a D$_{50}$ of 3.6 μm and a secondary particle-type Li[Ni$_{0.70}$Co$_{0.10}$Mn$_{0.20}$]O$_2$ having a D$_{50}$ of 7.8 μm were mixed at a weight ratio of 25:75 and used as the positive electrode active material.

Comparative Exmaple 8

A positive electrode, a negative electrode, and a lithium secondary battery were manufactured in the same manner as in Example 1, except that graphite and SiO were mixed at a weight ratio of 95:5 and used as the negative electrode active material.

Comparative Example 9

A positive electrode, a negative electrode, and a lithium secondary battery were manufactured in the same manner as in Example 2, except that graphite and SiO were mixed at a weight ratio of 95:5 and used as the negative electrode active material.

Comparative Example 10

A positive electrode, a negative electrode, and a lithium secondary battery were manufactured in the same manner as in Example 3, except that graphite and SiO were mixed at a weight ratio of 95:5 and used as the negative electrode active material.

Comparative Example 11

A positive electrode, a negative electrode, and a lithium secondary battery were manufactured in the same manner as in Example 1, except that LiPF$_6$:LiFSI was used as a lithium salt mixed at a weight ratio of 50:50 when manufacturing the lithium secondary battery.

Comparative Example 12

A positive electrode, a negative electrode, and a lithium secondary battery were manufactured in the same manner as in Example 3, except that LiPF$_6$:LiFSI was used as a lithium salt mixed at a weight ratio of 70:30 when manufacturing the lithium secondary battery.

Experimental Example 1

Each of the lithium secondary battery cells manufactured in Examples 1 to 6 and Comparative Examples 1 to 12 was subjected to charging and discharging in the voltage range of 2.5 V to 4.35 V at 0.33 C, and then a discharge capacity (C) was measured. Thereafter, a test module was manufactured by stacking four of the lithium secondary battery cell of each Example and Comparative Example. A total discharge capacity C$_{total}$ of the test module was calculated as 4 C.

After heating, thereby igniting one lithium secondary battery cell disposed at the outermost periphery of the test module, the time taken from the point of time at which the voltage of the lithium secondary battery disposed at the outermost periphery became 0 until the point of time at which the voltage of all lithium secondary batteries in the test module became 0 was measured. The voltage of each of the lithium secondary batteries was measured with a data logger.

The measurement results are shown in [Table 1] below and FIG. 1.

TABLE 1

| | Capacity of unit cell C (Ah) | Capacity of test module (Ah) | t (sec) | V$_T$ (Ah/sec) |
|---|---|---|---|---|
| Example 1 | 41 | 164 | 54.30 | 3.02 |
| Example 2 | 41 | 164 | 53.77 | 3.05 |
| Example 3 | 41 | 164 | 51.41 | 3.19 |
| Exmaple 4 | 41 | 164 | 42.38 | 3.87 |
| Exmaple 5 | 41 | 164 | 41.88 | 3.92 |
| Example 6 | 41 | 164 | 41.56 | 3.95 |
| Comparative Example 1 | 41 | 164 | 33.20 | 4.94 |
| Comparative Example 2 | 41 | 164 | 35.96 | 4.56 |
| Comparative Example 3 | 41 | 164 | 21.13 | 7.76 |
| Comparative Example 4 | 41 | 164 | 19.36 | 8.47 |
| Comparative Example 5 | 41 | 164 | 34.97 | 4.69 |
| Comparative Example 6 | 41 | 164 | 40.24 | 4.08 |
| Comparative Example 7 | 41 | 164 | 39.86 | 4.11 |
| Comparative Example 8 | 41 | 164 | 38.33 | 4.28 |
| Comparative Example 9 | 41 | 164 | 37.78 | 4.34 |
| Comparative Example 10 | 41 | 164 | 36.70 | 4.47 |
| Comparative Example 11 | 41 | 164 | 39.61 | 4.14 |
| Comparative Example 12 | 41 | 164 | 39.23 | 4.18 |

Experimental Example 2

Sixteen of each of the lithium secondary battery cells manufactured in Examples 1 to 6 and Comparative Examples 1 to 12 were stacked to manufacture battery modules. Thereafter, a unit cell disposed at the outermost periphery of each of the battery modules was heated using a heating device to measure the time at which flame was generated until the time at which the battery module was burnt down.

TABLE 2

| | Burnt-down time (sec) |
|---|---|
| Example 1 | 464 |
| Example 2 | 452 |
| Example 3 | 416 |
| Example 4 | 398 |
| Example 5 | 396 |
| Example 6 | 387 |
| Comparative Example 1 | 225 |
| Comparative Example 2 | 268 |
| Comparative Example 3 | 132 |
| Comparative Example 4 | 107 |
| Comparative Example 5 | 240 |
| Comparative Example 6 | 348 |
| Comparative Example 7 | 337 |
| Comparative Example 8 | 314 |
| Comparative Example 9 | 312 |
| Comparative Example 10 | 283 |
| Comparative Example 11 | 332 |
| Comparative Example 12 | 326 |

Through Table 2 above, it can be confirmed that the battery module using the lithium secondary battery of each of Examples 1 to 6, which has a $V_T$ of 4 Ah/sec or less, as a unit cell takes longer time to be burnt down than the battery module using the lithium secondary battery of each of Comparative Examples 1 to 12, which has a $V_T$ of greater than 4 Ah/sec, and thus, has excellent thermal runaway stability.

What is claimed is:

1. A lithium secondary battery comprising:
    a positive electrode including a positive electrode active material;
    a negative electrode including a negative electrode active material; and
    an electrolyte,
wherein:
    the lithium secondary battery has a nominal voltage of 3.68 V or greater; and
    the lithium secondary battery is configured so that $V_T$ represented by Equation (1) below measured after manufacturing a test module by stacking four lithium secondary batteries, each of which is fully charged by being charged to 4.35 V, is 4 Ah/sec or less:

$$V_T = C_{total}/t \qquad \text{Equation (1)}$$

wherein,
    $C_{total}$ is a total discharge capacity of a test module, and
    t is time taken, after one lithium secondary battery disposed at the outermost periphery of the test module is heated so as to be ignited, from a point of time at which voltage of the lithium secondary battery disposed at the outermost periphery becomes 0 until the point of time at which the voltage of all four lithium secondary batteries in the test module becomes 0.

2. The lithium secondary battery of claim 1, wherein the positive electrode active material includes 50 wt % or greater of a single particle-type lithium nickel-based oxide having a Ni content of 70 mol % or less based on all metals excluding lithium relative to a total weight of the positive electrode active material.

3. The lithium secondary battery of claim 2, wherein the single particle-type lithium nickel-based oxide comprises 30 or fewer nodules, wherein an average particle diameter of the nodules is 0.8 μm to 4.0 μm.

4. The lithium secondary battery of claim 2, wherein the single particle-type lithium nickel-based oxide is represented by Formula 1 below:

$$Li_{1+x}[Ni_aCo_bMn_cM^1{}_d]O_2 \qquad \text{[Formula 1]}$$

wherein, $M^1$ includes one or more elements of Ti, Mg, Al, Zr, Y, Ba, Ca, Sr, W, Ta, Nb, or Mo, and
−0.1≤x≤0.1, 0.5≤a≤0.7, 0<b<0.5, 0<c<0.5, and 0≤d≤0.2.

5. The lithium secondary battery of claim 2, wherein the single particle-type lithium nickel-based oxide further comprises a coating layer on the surface thereof, wherein the coating layer includes one or more elements of Ti, Mg, Al, Zr, Y, Ba, Ca, Sr, W, Ta, Nb, or Mo.

6. The lithium secondary battery of claim 1, wherein the positive electrode active material consists of a single particle-type lithium nickel-based oxide having a Ni content of 70 mol % or less based on all metals excluding lithium.

7. The lithium secondary battery of claim 1, wherein the negative electrode active material consists of a carbon-based negative electrode active material.

8. The lithium secondary battery of claim 1, wherein the negative electrode comprises:
    a negative electrode current collector;
    a first negative electrode active material layer formed on the negative electrode current collector, the first negative electrode active material layer including a first negative electrode active material; and
    a second negative electrode active material layer formed on the first negative electrode active material layer, the second negative electrode active material layer including a second negative electrode active material,
    wherein each of the first negative electrode active material and the second negative electrode active material consists of a carbon-based negative electrode active material.

9. The lithium secondary battery of claim 8, wherein each of the first negative electrode active material and the second negative electrode active material is independently natural graphite, artificial graphite, or a mixture thereof.

10. The lithium secondary battery of claim 9, wherein a weight ratio of the artificial graphite to a total weight of the negative electrode active material in the second negative electrode active material layer is higher than a weight ratio of the artificial graphite to a total weight of the negative electrode active material in the first negative electrode active material layer.

11. The lithium secondary battery of claim 1, wherein the lithium secondary battery has an electrolyte weight per unit capacity of 1.0 g/Ah to 3.0 g/Ah.

12. The lithium secondary battery of claim 1, wherein $V_T$ represented by Equation (1) is 1 Ah/sec to 4 Ah/sec.

13. The lithium secondary battery of claim 1, wherein the electrolyte comprises:
    an organic solvent; and
    a lithium salt,
    wherein the electrolyte satisfies the following equation (2):

$$0 \le W_I \le \frac{40.01}{1+\exp\left(\frac{a-69.9999}{1.2}\right)} \qquad (2)$$

wherein,
    $W_I$ is a content of an imide-based lithium salt among a total lithium salts, and
    a is mol % Ni based on all metals excluding lithium of the positive electrode active material.

14. The lithium secondary battery of claim 1, wherein the lithium secondary battery has a charge cut-off voltage of 4.35 V or greater.

15. The lithium secondary battery of claim 1, wherein the lithium secondary battery has a charge cut-off voltage of 4.35 V to 4.5 V.

16. A battery module comprising the lithium secondary battery according to claim 1 as a unit cell.

17. The battery module according to claim 16, wherein the battery module comprises between 10 and 50 unit cells.

18. A battery pack comprising the battery module of claim 16.

19. A battery pack comprising the lithium secondary battery according to claim 1 as a unit cell.

20. The battery pack according to claim 19, wherein the battery pack comprising between 10 and 1,000 unit cells.

* * * * *